(12) United States Patent
Yang et al.

(10) Patent No.: US 11,912,630 B2
(45) Date of Patent: Feb. 27, 2024

(54) METHOD OF PREPARING RECYCLED CEMENTITIOUS MATERIAL BY PHOSPHOGYPSUM-ASSISTED CARBON SEQUESTRATION PRETREATMENT PROCESS

(71) Applicant: Hubei University Of Technology, Hubei (CN)

(72) Inventors: Jin Yang, Hubei (CN); Xiaolei Yu, Hubei (CN); Xingyang He, Hubei (CN); Ying Su, Hubei (CN); Mingchao Zhang, Hubei (CN); Qiang Zhang, Hubei (CN); Zhengqi Zheng, Hubei (CN); Hongbo Tan, Hubei (CN)

(73) Assignee: Hubei University Of Technology, Hubei (CN)

( * ) Notice: Subject to any disclaimer, the term of this patent is extended or adjusted under 35 U.S.C. 154(b) by 0 days.

(21) Appl. No.: 18/322,534

(22) Filed: May 23, 2023

(65) Prior Publication Data

US 2023/0382790 A1 Nov. 30, 2023

(30) Foreign Application Priority Data

May 30, 2022 (CN) .......................... 202210614462.7

(51) Int. Cl.
 *C04B 7/38* (2006.01)
 *C04B 7/52* (2006.01)
 (Continued)

(52) U.S. Cl.
 CPC ............ *C04B 7/1535* (2013.01); *C04B 7/522* (2013.01); *C04B 28/08* (2013.01); *C04B 28/143* (2013.01)

(58) Field of Classification Search
 CPC ....... C04B 7/1535; C04B 22/06; C04B 22/08; C04B 24/02; C04B 28/14; C04B 28/143; C04B 40/00
 See application file for complete search history.

(56) References Cited

U.S. PATENT DOCUMENTS

| 2011/0067605 | A1 | 3/2011 | Constantz et al. |
| 2011/0259228 | A1* | 10/2011 | Mills ........................ F42D 1/24 102/333 |
| 2022/0267208 | A1* | 8/2022 | Atakan ................. C04B 20/023 |

FOREIGN PATENT DOCUMENTS

| CN | 101337685 A | * | 1/2009 |
| CN | 105819811 | | 8/2016 |

(Continued)

OTHER PUBLICATIONS

Lachehab et al., Utilization of phosphogypsum in CO2 mineral sequestration by producing potassium sulphate and calcium carbonate, Materials Science for Energy Technologies 3 (2020) 611-625.*

(Continued)

*Primary Examiner* — Jun Li
(74) *Attorney, Agent, or Firm* — JCIP GLOBAL INC.

(57) ABSTRACT

The present invention provides a method of preparing a recycled cementitious material by a phosphogypsum-assisted carbon sequestration pretreatment process. The method includes: (1) placing 100 mass parts of phosphogypsum, 1 to 2 mass parts of grinding aid, 10 to 20 mass parts of sodium-containing alkali component, 150 to 300 mass parts of zirconia balls, and 150 to 300 mass parts of water into a wet grinding tank for wet grinding. After 10 min to 30 min of wet grinding, introducing $CO_2$ at a flow rate of 1.5 to 2.2 mass parts/min to keep a temperature of a wet grinding slurry below 40° C. When the wet grinding slurry reaches pH=10, ending the wet grinding and sieving out a wet grinding slurry; (2) mixing the wet grinding slurry with (Continued)

700 to 1000 mass parts of slag and 100 to 350 mass parts of water to obtain a recycled cementitious material.

8 Claims, 1 Drawing Sheet

(51) Int. Cl.
 *C04B 28/08* (2006.01)
 *C04B 7/153* (2006.01)
 *C04B 28/14* (2006.01)

(56) References Cited

FOREIGN PATENT DOCUMENTS

| CN | 108147769 | | 6/2018 | |
|---|---|---|---|---|
| CN | 108751220 | A * | 11/2018 | |
| CN | 110104984 | A * | 8/2019 | ........... C04B 28/143 |
| CN | 110877914 | | 3/2020 | |
| CN | 111039640 | A * | 4/2020 | |
| CN | 111848093 | A * | 10/2020 | |
| CN | 111875332 | | 11/2020 | |
| CN | 111978061 | | 11/2020 | |
| CN | 114477806 | | 5/2022 | |
| WO | 2013020066 | | 2/2013 | |

OTHER PUBLICATIONS

Sun et al., Optimizing Synergy between Phosphogypsum Disposal and Cement Plant CO2 Capture by the Calcium Looping Process, Energy Fuels 2016, 30, 1256-1265.*

Ren et al., Low-Carbon Sustainable Composites fromWaste Phosphogypsum and Their Environmental Impacts, Crystals 2021, 11, 719.*

He Pianpian et al., "Study on the Preparation of CaCO3 by Phosphogypsum Solid Carbon through Orthogonal Experiment", Non-Metallic Mines, vol. 38, No. 2, Mar. 2015, with English translation thereof, pp. 1-10.

* cited by examiner

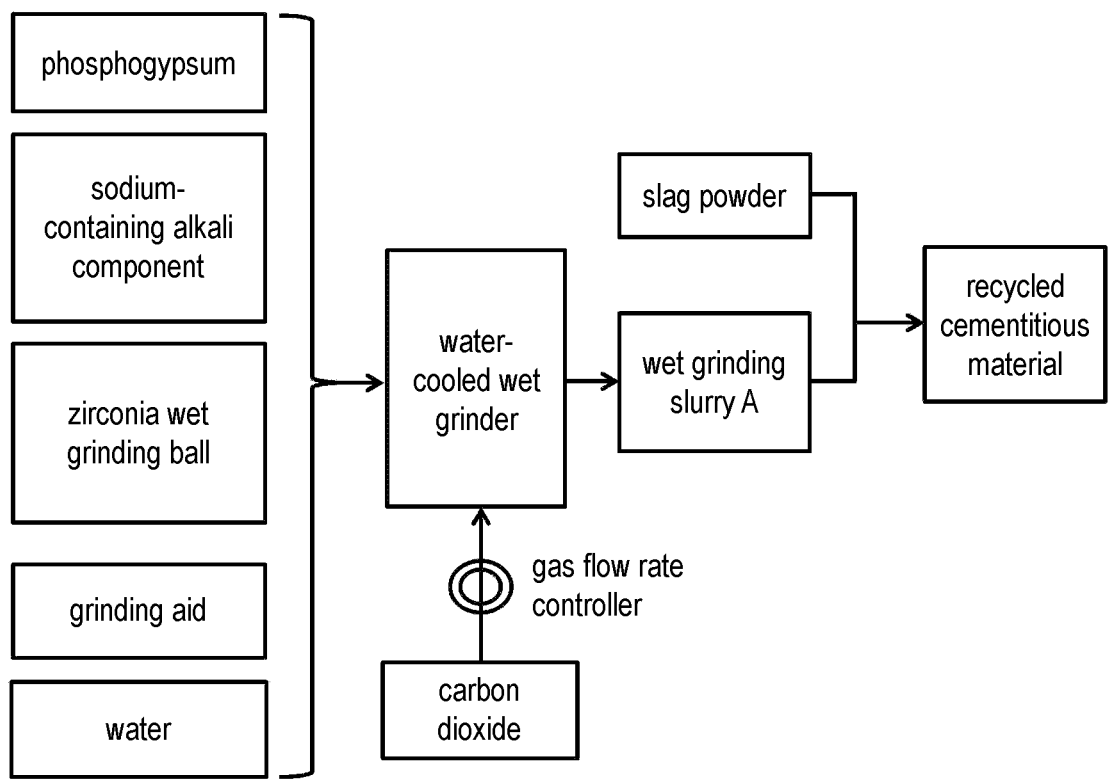

METHOD OF PREPARING RECYCLED CEMENTITIOUS MATERIAL BY PHOSPHOGYPSUM-ASSISTED CARBON SEQUESTRATION PRETREATMENT PROCESS

CROSS-REFERENCE TO RELATED APPLICATION

The present application is based on and claims the priority benefits of China application No. 202210614462.7, filed on May 30, 2022. The entirety of the above-mentioned patent application is hereby incorporated by reference herein and made a part of this specification.

BACKGROUND

Technical Field

The present invention relates to a field of solid waste material treatments, and in particular to a method of preparing a recycled cementitious material by a phosphogypsum-assisted carbon sequestration pretreatment process.

Description of Related Art

Since the human society entered the industrial revolution, the industrial production activities of the human being produced a huge amount of greenhouse gases (mainly $CO_2$) to the atmosphere, such that the whole earth surface was covered with a thick heat insulation layer. The heat insulation layer isolates the radiation difference between inside and outside the earth, leading to rise of the surface temperature of the earth and hence generating a greenhouse effect. Global warming now endangers the whole human being and the whole global ecological balance. Further, along with increase of the industrialization level, the situation will become more and more severe. Carbon capture and storage (CCS) technology can use carbonation reaction between natural ores and $CO_2$ to produce a stable carbonate for storage of $CO_2$. Due to good thermal stability of the obtained product and no harm to the environment, it is widely accepted by various circles of life.

At present, phosphogypsum, as a byproduct of chemical plants, is produced in a quantity of over 70 million tons per year. The major ingredients of the phosphogypsum are similar to those of gypsum and thus the phosphogypsum can serve as a substitute for gypsum. But due to the technical reasons, the phosphogypsum is mainly treated by stockpiling in the current stage, which discharges a huge amount of heavy metals and radionuclides to the stockpiling environment. Thus, it is an irresistible trend to accelerate resource-oriented utilization of the phosphogypsum.

SUMMARY

The object of the present invention is to provide a method of preparing a recycled cementitious material by a phosphogypsum-assisted carbon sequestration pretreatment process.

In the present invention, water, phosphogypsum, a sodium-containing alkali component, a grinding aid and wet grinding balls are mixed to perform wet grinding with $CO_2$ introduced, so as to obtain a wet grinding slurry, and next, the wet grinding slurry, water and slag are mixed uniformly to obtain a cementitious material.

The present invention provides the following technical solution.

The method of preparing a recycled cementitious material by a phosphogypsum-assisted carbon sequestration pretreatment process includes the following steps:

(1) 100 parts by mass of phosphogypsum, 1 to 2 parts by mass of grinding aid, 10 to 20 parts by mass of a sodium-containing alkali component, 150 to 300 parts by mass of zirconia balls, and 150 to 300 parts by mass of water are placed into a wet grinding tank for wet grinding. After 10 min to 30 min of wet grinding, then $CO_2$ is introduced at a flow rate of 1.5 to 2.2 parts by mass/min to keep a temperature of a wet grinding slurry below 40° C. When the wet grinding slurry reaches pH=10, the wet grinding is ended and a wet grinding slurry is sieved out.

In this step, before the wet grinding, a pH of the slurry is not less than 13, and during the wet grinding, the pH is kept above 10. When the pH decreases to 10, introduction of CO2 is stopped. In this step, the purpose of creating an alkaline environment and controlling the temperature of the wet grinding slurry below 40° C. is to induce the crystal formed of precipitation of calcium carbonate as vaterite.

(2) The wet grinding slurry is mixed with 500 to 1000 parts by mass of slag and 100 to 350 parts by mass of water to obtain a recycled cementitious material.

The preferred solution of the above method is as follows:

(1) 100 parts by mass of phosphogypsum, 1 to 2 parts by mass of grinding aid, 10 to 20 parts by mass of a sodium-containing alkali component, 150 to 300 parts by mass of zirconia balls, and 200 to 300 parts by mass of water are placed into a wet grinding tank for wet grinding. After 10 min to 30 min of wet grinding, then $CO_2$ is introduced at a flow rate of 1.8 to 2.2 parts by mass/min to keep a temperature of a wet grinding slurry below 40° C. When the wet grinding slurry reaches pH=10, the wet grinding is ended and a wet grinding slurry is sieved out.

(2) The wet grinding slurry is mixed with 700 to 1000 parts by mass of slag and 100 to 350 parts by mass of water to obtain a recycled cementitious material.

A further preferred solution of the above method is as follows:

(1) 100 parts by mass of phosphogypsum, 1 to 2 parts by mass of grinding aid, 20 parts by mass of a sodium-containing alkali component, 200 to 300 parts by mass of zirconia balls, and 200 to 300 parts by mass of water are placed into a wet grinding tank for wet grinding. After 10 min to 30 min of wet grinding, then $CO_2$ is introduced at a flow rate of 2.0 to 2.2 parts by mass/min to keep a temperature of a wet grinding slurry below 40° C. When the wet grinding slurry reaches pH=10, the wet grinding is ended and a wet grinding slurry is sieved out.

(2) The wet grinding slurry is mixed with 700 parts by mass of slag and 100 to 200 parts by mass of water to obtain a recycled cementitious material.

In some specific examples, before the wet grinding, the phosphogypsum is dried and dehydrated.

In some specific examples, a median particle size of the phosphogypsum is 20 m to 40 m.

In some specific examples, the grinding aid is triethanolamine.

In some specific examples, the sodium-containing alkali component is obtained by mixing one or two of sodium ethoxide and sodium hydroxide with sodium silicate.

In some specific examples, during the wet grinding, the temperature of the slurry is controlled below 40° C. by water cooling. The slurry temperature is usually controlled between 20° C. and 40° C.

In some specific examples, the slag is an S95 slag powder.

The phosphogypsum contains rich calcium elements and sulfate radicals, which provides a potential that the phosphogypsum serves as a carbon sequestration medium and an activator. But, under normal conditions, the above components are difficult to dissolve out. In the present invention, due to mechanical force of wet grinding and chemical dissolution promotion of the alkaline environment, the calcium ions in the phosphogypsum can be efficiently dissolved out and combined with $CO_2$ to generate a calcium carbonate precipitation. In this process, by carbonation temperature control and pH regulation, more vaterite is induced to be generated, so as to improve the accumulation state of the hydrated gel product generated by slag activation in later stage. In addition, sodium sulfate generated by combination of sulfate ions released by composite dissolution promotion of mechanical force and chemicals and the sodium-containing alkali component is a slag activator having excellent effect. In the assistance of carbon sequestration pretreatment process, the phosphogypsum is fully employed to achieve the effects of carbon sequestration medium and activator, realizing resource-oriented high-value-added utilization by combination of the carbon capture and storage technology with the solid waste.

In the present invention, the violent mechanical force generated by the wet grinding accelerates dissolution of metal ions from the solid wastes. $Na^+$ in the alkali component is combined with $SO_4^{2-}$ in the slurry to form a new component $Na_2SO_4$ which can be used as an activator to activate the slag powder so as to prepare a recycled cementitious material. The combination of $Na_2SO_4$ and the slag powder generates a hydrated gel product, and during the phase change process, it promotes the accumulation and the compactness of the gel product to increase the mechanical performance of the cementitious material.

The present invention has the following beneficial effects.

1. By the cooperative treatment of the violent mechanical force generated by the wet grinding and the alkaline environment provided by the sodium-containing alkali component, the dissolution- of $Ca^{2+}$ and $SO_4^{2-}$ in the phosphogypsum is promoted, and $CO_2$ is quickly introduced to achieve carbon sequestration. Further, the gas flow rate, temperature and pH of $CO_2$ are controlled to regulate the crystal form of calcium carbonate as an active metastable vaterite. In the present invention, the cooperative treatment promotes ion dissolution from the phosphogypsum the solid waste phosphogypsum is efficiently consumed and used for for the carbon sequestration.

2. $Na^+$ in the alkali component is combined with $SO_4^{2-}$ in the slurry to form a new component $Na_2SO_4$ which can be used as an activator to activate the slag powder so as to prepare a recycled cementitious material. In the present invention, the solid wastes are fully utilized in a green and environment-friendly way.

3. $Na_2SO_4$ is combined with the slag powder to generate a gel product. The active metastable vaterite is subjected to phase change in the hydration and hardening environment of the slags, and the $Ca^{2+}$ and $CO_3^{2-}$ released can react and precipitate as calcite. The phase change can promote accumulation and compactness of the gel product to increase the mechanical performance of the cementitious material.

BRIEF DESCRIPTIONS OF THE DRAWINGS

The FIGURE is a process flowchart of the present invention.

DESCRIPTIONS OF EMBODIMENTS

In order to better understand the present invention, the following examples of the present invention will be further described in details below, but the present invention is not limited to these examples.

In the examples and comparative examples, the phosphogypsum comes from the solid wastes discharged by Hubei Yihua, where the median particle size is 30 m; the slags used herein come from S95 slag powder of Baowu Steel, and the sodium-containing alkali component is obtained by mixing sodium ethoxide, sodium hydroxide and sodium silicate at the mass ratio of 1.1.2.

The FIGURE is a process flowchart of an example of the present invention. The specific process flow of each example will be described below in combination with the FIGURE.

Example 1

The present example includes the following specific steps.

(1) Wet Grinding and Carbon Sequestration Treatment of Phosphogypsum 100 parts by mass of phosphogypsum, 10 parts by mass of a sodium-containing alkali component, 150 parts by mass of zirconia balls with a diameter of 2.0 mm to 2.5 mm, 150 parts by mass of water, and one part by mass of triethanolamine were placed into a wet grinding tank for wet grinding at a rotation speed of 400 r/min. After 10 min, $CO_2$ was introduced at a flow rate of 1.5 parts by mass/min. The temperature of the slurry was controlled to below 40° C. by water cooling. The pH of the slurry was dynamically monitored. When the pH=10, the introduction of $CO_2$ was stopped, the wet grinding was ended, and then a wet grinding slurry was sieved out.

(2) Preparation of Recycled Cementitious Material

The wet grinding slurry obtained in step (1) was mixed with 500 parts by mass of slags and 150 parts by mass of water and stirred uniformly. Then they were poured into a standard slurry compressive iron mold of 40 mm×40 mm×40 mm with the top covered with a preservation film and then put into a standard curing box for standard curing. After 28d, the standard compressive strength was tested by referring to the standard GB/T 17671-2021 Test method of cement mortar strength.

Example 2

The present example includes the following specific steps.

(1) Wet Grinding and Carbon Sequestration Treatment of Phosphogypsum 100 parts by mass of phosphogypsum, 10 parts by mass of a sodium-containing alkali component, 150 parts by mass of zirconia balls with a diameter of 2.0 mm to 2.5 mm, 200 parts by mass of water, and 2 parts by mass of triethanolamine were placed into a wet grinding tank for wet grinding at a rotation speed of 400 r/min. After 20 min, $CO_2$ was introduced at a flow rate of 1.8 mass parts by mass/min. The temperature of the slurry was controlled to below 40° C. by water cooling. The pH of the slurry was dynamically monitored. When the pH=10, the introduction of $CO_2$ was stopped, the wet grinding was ended, and then a wet grinding slurry was sieved out.

(2) Preparation of Recycled Cementitious Material

The wet grinding slurry obtained in step (1) was mixed with 700 parts by mass of slags and 100 parts by mass of water and stirred uniformly. Then they were poured into a standard slurry compressive iron mold of 40 mm×40 mm×40 mm with the top covered with a preservation film and then put into a standard curing box for standard curing. After 28d, the standard compressive strength was tested by referring to the standard GB/T 17671-2021 Test method of cement mortar strength.

Example 3

The present example includes the following specific steps.
(1) Wet Grinding and Carbon Sequestration Treatment of Phosphogypsum 100 parts by mass of phosphogypsum, 20 parts by mass of a sodium-containing alkali component, 200 parts by mass of zirconia balls with a diameter of 2.0 mm to 2.5 mm, 200 parts by mass of water, and 1 part by mass of triethanolamine were placed into a wet grinding tank for wet grinding at a rotation speed of 400 r/min. After 20 min, $CO_2$ was introduced at a flow rate of 2.0 parts by mass/min. The temperature of the slurry was controlled to below 40° C. by water cooling. The pH of the slurry was dynamically monitored. When the pH=10, the introduction of $CO_2$ was stopped, the wet grinding was ended, and then a wet grinding slurry was sieved out.

(2) Preparation of Recycled Cementitious Material

The wet grinding slurry obtained in step (1) was mixed with 700 parts by mass of slags and 200 parts by mass of water and stirred uniformly. Then they were poured into a standard slurry compressive iron mold of 40 mm×40 mm×40 mm with the top covered with a preservation film and then put into a standard curing box for standard curing. After 28d, the standard compressive strength was tested by referring to the standard GB/T 17671-2021 Test method of cement mortar strength.

Example 4

The present example includes the following specific steps.
(1) Wet Grinding and Carbon Sequestration Treatment of Phosphogypsum 100 parts by mass of phosphogypsum, 20 parts by mass of a sodium-containing alkali component, 300 parts by mass of zirconia balls with a diameter of 2.0 mm to 2.5 mm, 300 parts by mass of water, and 2 parts by mass of triethanolamine were placed into a wet grinding tank for wet grinding at a rotation speed of 400 r/min. After 30 min, $CO_2$ was introduced at a flow rate of 2.2 parts by mass/min. The temperature of the slurry was controlled to below 40° C. by water cooling. The pH of the slurry was dynamically monitored. When the pH=10, the introduction of $CO_2$ was stopped, the wet grinding was ended, and then a wet grinding slurry was sieved out.

(2) Preparation of Recycled Cementitious Material

The wet grinding slurry obtained in step (1) was mixed with 700 parts by mass of slags and 100 parts by mass of water and stirred uniformly. Then they were poured into a standard slurry compressive iron mold of 40 mm×40 mm×40 mm with the top covered with a preservation film and then put into a standard curing box for standard curing. After 28d, the standard compressive strength was tested by referring to the standard GB/T 17671-2021 Test method of cement mortar strength.

Example 5

The present example includes the following specific steps.
(1) Wet Grinding and Carbon Sequestration Treatment of Phosphogypsum 100 parts by mass of phosphogypsum, 20 parts by mass of a sodium-containing alkali component, 200 parts by mass of zirconia balls with a diameter of 2.0 mm to 2.5 mm, 200 parts by mass of water, and 2 parts by mass of triethanolamine were placed into a wet grinding tank for wet grinding at a rotation speed of 400 r/min. After 30 min, $CO_2$ was introduced at a flow rate of 2.2 parts by mass/min. The temperature of the slurry was controlled to below 40° C. by water cooling. The pH of the slurry was dynamically monitored. When the pH=10, the introduction of $CO_2$ was stopped, the wet grinding was ended, and then a wet grinding slurry was sieved out.

(2) Preparation of Recycled Cementitious Material

The wet grinding slurry obtained in step (1) was mixed with 1000 parts by mass of slags and 350 parts by mass of water and stirred uniformly. Then they were poured into a standard slurry compressive iron mold of 40 mm×40 mm×40 mm with the top covered with a preservation film and then put into a standard curing box for standard curing. After 28d, the standard compressive strength was tested by referring to the standard GB/T 17671-2021 Test method of cement mortar strength.

COMPARATIVE EXAMPLE

The comparative example includes the following specific steps.

100 parts by mass of phosphogypsum, 20 parts by mass of a sodium-containing alkali component, 700 parts by mass of slags, and 400 parts by mass of water were mixed uniformly and poured into a standard slurry compressive iron mold of 40 mm×40 mm×40 mm with the top covered with a preservation film and then put into a standard curing box for standard curing. After 28d, the standard compressive strength was tested by referring to the standard GB/T 17671-2021 Test method of cement mortar strength, as indicated in Table 1.

A carbon conversion rate and a carbon conversion efficiency are calculated based on thermogravimetric analysis (TG) data, where the carbon conversion efficiency refers to a mass of carbon dioxide sequestrated by a unit mass of carbon sequestration material in a unit time. In the present example, the carbon sequestration material refers to the "wet grinding slurry". The "part" in the unit "parts/(parts*h)" of the carbon conversion efficiency refers to a part by mass.

It can be seen from Table 1 that during a wet grinding and carbon sequestration process of the phosphogypsum, the carbon sequestration efficiency increases along with increase of water-phosphogypsum ratio, ball-phosphogypsum ratio and $CO_2$ flow rate. Under the influence of the content of vaterite, the compressive strength of the recycled cementitious material increases along with increase of the content of vaterite. By comparison of the examples and the comparative example, it can be seen that the vaterite has a significant gain effect on the recycled cementitious material.

TABLE 1

Carbon conversion efficiencies and compressive strengths of the recycled cementitious materials obtained in the examples and the comparative example

| Name | Solid content of slurry A (unit: %) | Carbon conversion rate (unit: %) | Carbon conversion efficiency (unit: parts/(parts*h)) | 28 d Compressive strength (unit: MPa) |
|---|---|---|---|---|
| Example 1 | 41.2 | 7.3 | 4.8 | 36.2 |
| Example 2 | 52.5 | 10.2 | 5.6 | 38.4 |
| Example 3 | 35 | 12.1 | 6.05 | 42.7 |
| Example 4 | 54.1 | 19.1 | 8.63 | 44.3 |
| Example 5 | 24.1 | 13.6 | 6.18 | 39.3 |
| Comparative example | / | / | / | 32.6 |

Each example of the present invention is described by way of control variables while focusing on the differences with other examples. The above descriptions for the examples of the present invention can enable those skilled in the art to implement or practice the present disclosure. It is apparent for those skilled in the part that various modifications may be made to these examples. The general principle defined herein can be implemented in other examples without departing from the spirit and scope of the present invention. Thus, the present invention is not limited to these examples of the present invention but falls within the widest scope consistent with the principle and novelty of the present invention. If those modifications and variations of the present invention belong to the claims or its equivalents of the present invention, the present invention is intended to include these modifications and variations.

What is claimed is:

1. A method of preparing a recycled cementitious material by a phosphogypsum-assisted carbon sequestration pretreatment process, comprising:
   (1) placing 100 parts by mass of phosphogypsum, 1 to 2 parts by mass of a grinding aid, 10 to 20 parts by mass of a sodium-containing alkali component, 150 to 300 parts by mass of zirconia balls, and 150 to 300 parts by mass of water into a wet grinding tank for wet grinding, before the wet grinding, a pH value of a slurry in the grinding tank being not less than 13, and after 10 min to 30 min of the wet grinding, introducing $CO_2$ at a flow rate of 1.5 to 2.2 parts by mass/min and keeping a temperature of a wet grinding slurry below 40° C., and when the wet grinding slurry reaching a pH value of 10, ending the wet grinding and sieving out the zirconia balls from the wet grinding slurry;
   (2) mixing the wet grinding slurry with 500 to 1000 parts by mass of slag and 100 to 350 parts by mass of water to obtain the recycled cementitious material;
   wherein the sodium-containing alkali component is obtained by mixing one or two of sodium ethoxide and sodium hydroxide with sodium silicate.

2. The method of claim 1, comprising:
   (1) placing 100 parts by mass of the phosphogypsum, 1 to 2 parts by mass of the grinding aid, 10 to 20 parts by mass of the sodium-containing alkali component, 150 to 300 parts by mass of the zirconia balls, and 200 to 300 parts by mass of the water into the wet grinding tank for the wet grinding, and after 10 min to 30 min of the wet grinding, introducing $CO_2$ at the flow rate of 1.8 to 2.2 parts by mass/min and keeping the temperature of the wet grinding slurry below 40° C., and when the wet grinding slurry reaching the pH value of 10, ending the wet grinding and sieving out the zirconia balls from the wet grinding slurry;
   (2) mixing the wet grinding slurry with 700 to 1000 parts by mass of the slag and 100 to 350 parts by mass of the water to obtain the recycled cementitious material.

3. The method of claim 1, comprising:
   (1) placing 100 parts by mass of the phosphogypsum, 1 to 2 parts by mass of the grinding aid, 20 parts by mass of the sodium-containing alkali component, 200 to 300 parts by mass of the zirconia balls, and 200 to 300 parts by mass of the water into the wet grinding tank for the wet grinding, and after 10 min to 30 min of the wet grinding, then introducing $CO_2$ at the flow rate of 2.0 to 2.2 parts by mass/min and keeping the temperature of the wet grinding slurry below 40° C., and when the wet grinding slurry reaching the pH value of 10, ending the wet grinding and sieving out the zirconia balls from the wet grinding slurry;
   (2) mixing the wet grinding slurry with 700 parts by mass of the slag and 100 to 200 parts by mass of the water to obtain the recycled cementitious material.

4. The method of claim 1, wherein,
a median particle size of the phosphogypsum is 20 μm to 40 μm.

5. The method of claim 1, wherein,
the grinding aid is triethanolamine.

6. The method of claim 1, wherein,
the sodium-containing alkali component is obtained by mixing sodium ethoxide, sodium hydroxide and sodium silicate at a mass ratio of 1:1:2.

7. The method of claim 1, wherein,
during the wet grinding, the temperature of the wet grinding slurry is controlled to below 40° C. by water cooling.

8. The method of claim 1, wherein,
the slag is an S95 slag powder.

* * * * *